(12) United States Patent
Kanagarajan et al.

(10) Patent No.: US 11,527,164 B2
(45) Date of Patent: Dec. 13, 2022

(54) METHODS AND SYSTEMS FOR GRAPHICAL REPRESENTATION OF REQUIRED TIME OF ARRIVAL (RTA) CONSTRAINT INFORMATION

(71) Applicant: HONEYWELL INTERNATIONAL INC., Morris Plains, NJ (US)

(72) Inventors: Sivakumar Kanagarajan, Bangalore (IN); Richard Snyder, Phoenix, AZ (US); Joshua Gavroy, Glendale, AZ (US); Chunyu Sheng, Shanghai (CN); Ivan Wyatt, Scottsdale, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 191 days.

(21) Appl. No.: 16/997,357

(22) Filed: Aug. 19, 2020

(65) Prior Publication Data
US 2021/0390863 A1    Dec. 16, 2021

(30) Foreign Application Priority Data
Jun. 16, 2020    (IN) .............................. 202011025274

(51) Int. Cl.
*G08G 5/00* (2006.01)
*B64D 43/00* (2006.01)

(52) U.S. Cl.
CPC ............ *G08G 5/003* (2013.01); *B64D 43/00* (2013.01); *G08G 5/0013* (2013.01); *G08G 5/0021* (2013.01); *G08G 5/0034* (2013.01); *G08G 5/0047* (2013.01)

(58) Field of Classification Search
CPC .... G08G 5/003; G08G 5/0013; G08G 5/0021; G08G 5/0047; G08G 5/0034; B64D 43/00
See application file for complete search history.

(56) References Cited

U.S. PATENT DOCUMENTS

| | | | | |
|---|---|---|---|---|
| 5,121,325 A | * | 6/1992 | DeJonge | .............. G05D 1/0005 |
| | | | | 701/123 |
| 6,970,784 B2 | | 11/2005 | Shinagawa | |
| 7,765,061 B1 | * | 7/2010 | Barber | ................... G01C 23/00 |
| | | | | 701/465 |
| 8,244,466 B2 | | 8/2012 | DeJonge et al. | |
| 8,396,614 B1 | * | 3/2013 | Pschierer | ............... G01C 23/00 |
| | | | | 701/4 |
| 9,047,763 B2 | * | 6/2015 | Passinger | ............. G08G 5/0052 |
| 9,193,442 B1 | * | 11/2015 | Young | .................... G08G 5/003 |
| 9,266,621 B2 | * | 2/2016 | Polansky | ............... G01C 23/00 |
| 9,494,945 B2 | * | 11/2016 | Coulmeau | ............ G08G 5/0039 |
| 9,829,341 B1 | * | 11/2017 | Swiderski | .............. G01C 23/00 |

(Continued)

FOREIGN PATENT DOCUMENTS

| | | |
|---|---|---|
| EP | 2804066 A1 | 11/2014 |
| WO | 2007/053636 A1 | 5/2007 |

*Primary Examiner* — Dale W Hilgendorf
(74) *Attorney, Agent, or Firm* — Lorenz & Kopf, LLP (57) ABSTRACT

Human-machine interface for required time of arrival (RTA) constraint negotiation. Embodiments present critical RTA information and results of associated data calculations to the pilot in a concise and informative manner using a dialogue box with intuitive graphical displays. Embodiments present critical RTA information to assist a pilot in negotiating the RTA constraint with air traffic controllers, accepting the clearance, and having confidence in the system that it will achieve the defined RTA constraint.

20 Claims, 10 Drawing Sheets

(56) References Cited

U.S. PATENT DOCUMENTS

| | | | |
|---|---|---|---|
| 10,144,505 B2* | 12/2018 | Kim | G08G 5/0021 |
| 2010/0114406 A1* | 5/2010 | DeJonge | G08G 5/0021 |
| | | | 701/1 |
| 2016/0379501 A1* | 12/2016 | Garrido Lopez | G08G 5/0052 |
| | | | 701/5 |
| 2020/0168106 A1 | 5/2020 | De Prins et al. | |
| 2022/0051573 A1* | 2/2022 | Crouch | G01C 23/00 |
| 2022/0215760 A1* | 7/2022 | Jorgensen | G08G 5/0026 |

* cited by examiner

METHODS AND SYSTEMS FOR GRAPHICAL REPRESENTATION OF REQUIRED TIME OF ARRIVAL (RTA) CONSTRAINT INFORMATION

TECHNICAL FIELD

The present disclosure generally relates to methods and systems for presenting flight information on a display, and more particularly relates to methods and systems for graphical representation of required time of arrival (RTA) constraint information on a display of an aircraft.

CROSS-REFERENCE TO RELATED APPLICATION

This application claims the benefit of IN Provisional Application No. 202011025274, filed Jun. 16, 2020, which is incorporated herein by reference in its entirety.

BACKGROUND

A function on many available flight management systems (FMS) on an aircraft provides the crew with the ability to enter a Required Time of Arrival (RTA) at a waypoint that is part of a given flight plan. The FMS adjusts the speed profile for the climb flight phase, cruise flight phase, and descent flight phase, as appropriate, in order to arrive at the waypoint within the prescribed RTA, thus improving the predictability of the aircraft. This function is also sometimes called TOAC (Time Of Arrival Control), as part of the arrival management.

The combination of the RTA and the waypoint may be referred to as an RTA constraint. A technical problem is presented in that many available FMS on an aircraft are insufficient to meet new requirements that the pilot negotiate with Air Traffic Control (ATC) to define an RTA constraint that can be met with a 95% reliable confidence. To meet this confidence level, a pilot may need much more readily and intuitively available information than the available FMS functions can provide.

Accordingly, improved methods and systems supporting RTA constraints are desirable. Specifically, improved methods and systems for graphical representation of required time of arrival (RTA) constraint information on a display of an aircraft are desirable. Other desirable features and characteristics will become apparent from the subsequent detailed description and the appended claims, taken in conjunction with the accompanying drawings and the foregoing technical field and background.

SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In accordance with various embodiments, a method for managing required time of arrival (RTA) information for an aircraft and displaying it on a display device configured to generate a display including a trajectory of the aircraft on a flight plan (FP) is provided. The method includes: at a processor, receiving aircraft status data for the aircraft; receiving aircraft performance data from onboard sensors; determining a plurality of phases of flight for the FP; receiving user RTA clearance input including an RTA waypoint on the FP, an associated RTA, and a time tolerance at the RTA; receiving a user input RTA limit speed; computing RTA limits based on the RTA and the time tolerance at the RTA; referencing environmental data; constructing a plan comprising, for each phase of flight of the plurality of phases of flight for the flight plan, a respective speed target, for the aircraft to arrive at the RTA within the time tolerance and as a function of the environmental data and the RTA limit speed; computing an estimated time of arrival (ETA) based on a summation of the phase of flight speed targets and the aircraft performance data; computing an ETA window based on the RTA limits and the aircraft performance data; adjusting a phase of flight speed to meet the respective speed target for at least one of the plurality of phases of flight, responsive to the ETA; generating a dialogue box in a dedicated area on the display; and presenting, using graphical display techniques, critical data including the RTA, RTA limits, estimated time of arrival (ETA), and the ETA Window, wherein the presenting includes utilizing a visualization technique to depict a performance-tolerance on one or more of the critical data, the performance tolerance being a function of the aircraft performance data.

Also provided is a system for managing required time of arrival (RTA) information for an aircraft and displaying it on a display device configured to generate a display including a trajectory of the aircraft on a flight plan (FP), comprising: a memory comprising an RTA constraint controller program; and a processor coupled to the memory and configured to: receive aircraft status data for the aircraft; receive aircraft performance data from onboard sensors; determine a plurality of phases of flight for the FP; receive user RTA clearance input including an RTA waypoint on the FP, an associated RTA, and a time tolerance at the RTA; receive a user input RTA limit speed; compute RTA limits based on the RTA and the time tolerance at the RTA; receive environmental data; construct a plan comprising, for each phase of flight of the plurality of phases of flight for the flight plan, a respective speed target, for the aircraft to arrive at the RTA within the time tolerance and as a function of the environmental data and the RTA limit speed; compute an estimated time of arrival (ETA) based on a summation of the phase of flight speed targets and the aircraft performance data; compute an ETA window based on the RTA limits and the aircraft performance data; adjust a phase of flight speed to meet the respective speed target for at least one of the plurality of phases of flight, responsive to the ETA; generate a dialogue box in a dedicated area on the display; present, using graphical display techniques, critical data including the RTA, RTA limits, estimated time of arrival (ETA), and the ETA Window, wherein the presenting includes utilizing a visualization technique to depict a performance-tolerance on one or more of the critical data, the performance tolerance being a function of the aircraft performance data.

Also provided is an embodiment of an aircraft. The aircraft including: a display device configured to generate a display including a trajectory of the aircraft on a flight plan (FP); and a system for managing required time of arrival (RTA) information for the aircraft and displaying it on the display device, comprising: a memory comprising an RTA constraint controller program; and a processor coupled to the memory and configured to: receive aircraft status data for the aircraft; receive aircraft performance data from onboard sensors; determine a plurality of phases of flight for the FP; receive user RTA clearance input including an RTA waypoint on the FP, an associated RTA, and a time tolerance at the RTA; receive a user input RTA limit speed; compute RTA limits based on the RTA and the time tolerance at the RTA; receive environmental data; construct a plan comprising, for each phase of flight of the plurality of phases of flight for the flight plan, a respective speed target, for the aircraft to arrive at the RTA within the time tolerance and as a function of the environmental data and the RTA limit speed; compute an estimated time of arrival (ETA) based on a summation of the phase of flight speed targets and the aircraft performance data; compute an ETA window based on the RTA limits and the aircraft performance data; adjust a phase of flight speed to meet the respective speed target for at least one of the plurality of phases of flight, responsive to the ETA; compute a time error, defined as a difference between the RTA and the ETA; generate a dialogue box in a dedicated area on the display; and present, using graphical display techniques, critical data including the RTA, RTA limits, time error, estimated time of arrival (ETA), and the ETA Window, wherein the presenting includes utilizing a visualization technique to depict a performance-tolerance on one or more of the critical data, the performance tolerance being a function of the aircraft performance data.

Furthermore, other desirable features and characteristics of the [system/method] will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

The following detailed description is merely exemplary in nature and is not intended to limit the disclosure or the application and uses of the disclosure. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

The addition of RTA information to a cockpit display, as disclosed in Bretislav et al., U.S. Pat. No. 9,047,763 B2 "METHODS AND SYSTEMS FOR REPRESENTING TIME OF ARRIVAL INFORMATION ON A COCKPIT DISPLAY," has increased a pilot's ability to comprehend time of arrival information. The provided embodiments enhance existing RTA functionality by generating and displaying a user interface having at least these additional features:

User interface enables entry of RTA parameters to define the RTA constraint, such as, but not limited to: a waypoint to apply, the time of the constraint, the type or definition of the bounds of the constraint, the acceptable error to the time, any limits on speeds across the flight phases to be apply to account for passenger comfort, aircraft performance limits, crew preferences, and fuel economy.

User interface employs intuitive Human Factors to construct a dialogue box and present thereon a graphical display of critical RTA data and information necessary for a pilot to negotiate the RTA constraint with an air traffic controller and to monitor the progress to the RTA constraint throughout the flight. This encompasses information on definition of the RTA constraint, ETA Window of the earliest and latest confident ETA times, predicted ETA of the aircraft. This uses symbology that can be quickly digested by the crew.

User interface presents a status of the system's ability to meet the constraint including on time, early or late arrivals and the error to the time if the system cannot control to meet the constraint due to unplanned wind condition, an AC aircraft (A/C) limitation, a Flight Planning limitation or a crew defined limitations.

User interface provides the capability for the crew to Activate/Deactivate the RTA at any point of time, in different phases of flight. Deactivating the RTA implies that the time constraint is deactivated from the flight plan, but it is retained for recovery later.

User interface provides the capability for the crew could turn on/off RTA for speed control. In addition, Pilots have visibility into the speed targets that will be flown for each region of the flight.

User interface provides a separate pilot or crew Interface for defining/modifying the RTA Limits for Climb/Cruise/Descent phases of flight and associated limits display.

User interface provides a graphical display and symbology to represent the state in which the system cannot resolve a reliable solution to meet the constraint.

Figure 1:
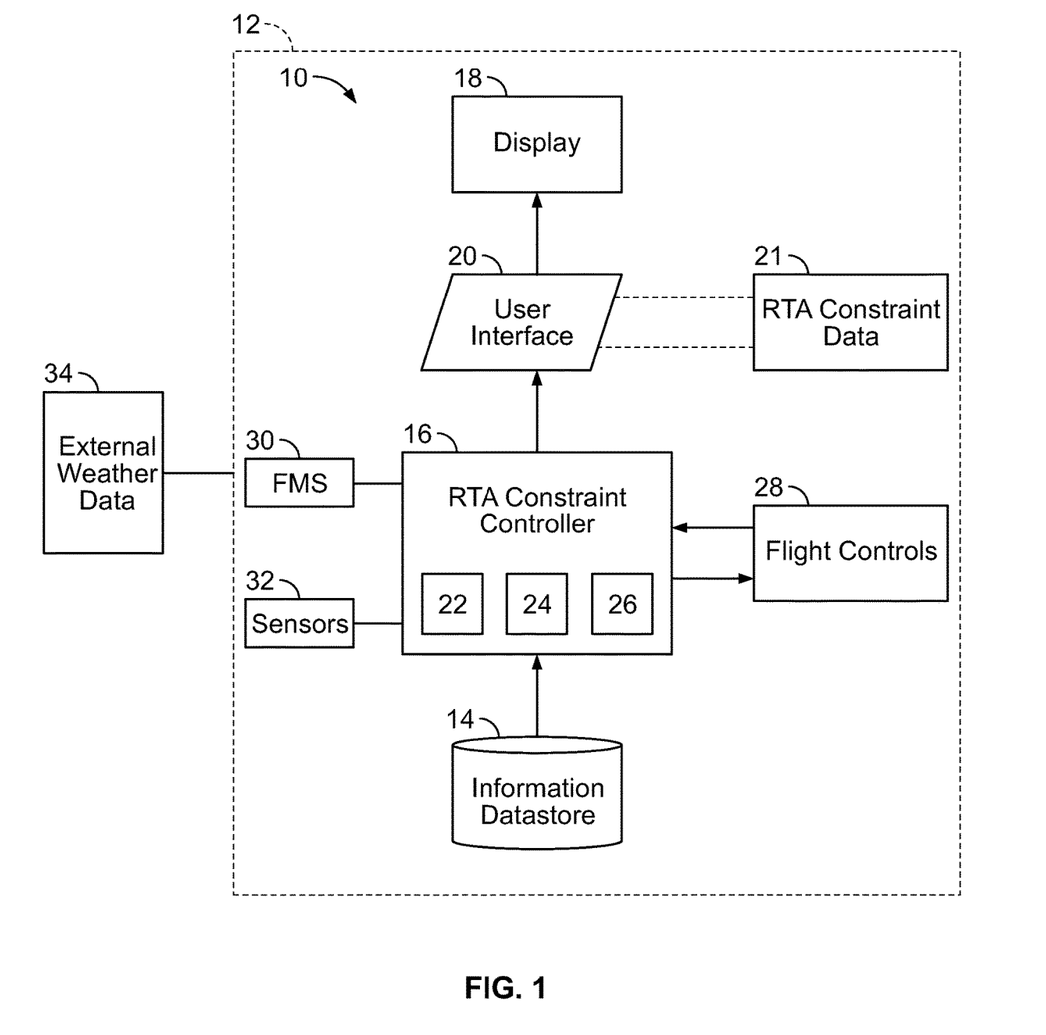
FIG. 1 is a functional block diagram illustrating a system for graphical representation of required time of arrival (RTA) constraint information for an aircraft in accordance with exemplary embodiments.

Referring now to FIG. 1, exemplary embodiments of the present disclosure are directed to graphical representations of required time of arrival (RTA) constraint information system shown generally at 10 (shortened hereinafter to system 10) that is associated with an aircraft 12. The system 10 includes an RTA constraint controller 16 that implements an algorithm and causes the system 10 to perform the functions described herein. As can be appreciated, in various embodiments, the RTA constraint controller 16 can be implemented in any aircraft 12 as an enhanced computing device that is associated with a display device, where the enhanced computing device includes at least a processor 22, one or more data storage devices 24, and input/output (IO) circuitry 26 for communication.

As shown in FIG. 1, the system 10 includes, but is not limited to, an information datastore 14, the RTA constraint controller 16, onboard sensors 32, and a display 18. The RTA constraint controller 16 transmits commands to and receives data from various flight controls 28. The RTA constraint controller 16 may be incorporated within or separate from, an existing Flight Management System (FMS 30). The RTA constraint controller 16 is configured to receive data from external sources, such as weather data source 34.

The information datastore 14 stores RTA definition information and pre-calculated time of arrival data which includes, but is not limited to, precalculated estimated time of arrival minimum and maximum predictions for given waypoints of a flight plan, precalculated optimal time of arrival, precalculated fuel predictions, precalculated impact on estimated time en-route (ETE), precalculated estimated time of arrival to destination (ETA), the precalculated estimated distance to go (DTG), and the estimated time of departure (ETD). The values of the pre-calculated time of arrival data are pre-calculated iteratively with an appropriate confidence envelope and may be stored in the information datastore 14 during an initialization step. As can be appreciated, the information datastore 14 may reside in a data storage device of an enhanced computing device on the aircraft 12, may reside in a data storage device on an enhanced computing device at a location remote from the aircraft 12 (e.g., on a central server), or may partially reside on the computing device of the aircraft 12 and partially on the computing device at the location remote from the aircraft 12.

In various embodiments, the RTA constraint controller 16 includes the processor 22 and one or more instructions implementing an algorithm, for example, as a RTA constraint controller software program stored in memory 24, that may be executed by the processor 22. In general, the instructions of the RTA constraint controller 16 coordinate access to and use of the information datastore 14, construct critical data for an RTA constraint 21 based on the precalculated information in the information datastore 14, and generate a user interface 20 having graphical representations of the critical data for the RTA constraint 21. As can be appreciated, depending on the location of the information datastore 14, the RTA constraint controller 16 may communicate with the information datastore 14 directly, and/or may communicate with the information datastore 14 indirectly through one or more communication circuits and protocols.

The display 18 is a display device that displays at least a part of the user interface 20. The display 18 may be located in a cockpit of the aircraft 12 for viewing by, for example, a pilot of the aircraft 12. In various embodiments, the display 18 can be an interactive display (e.g., a touch screen, or other interactive display) that accepts user input from a user through one or more user input devices (for example, FIG. 10, input device 1004). For example, a pilot may interact with the user interface 20 using one or more input devices to cause the system to display the estimated time of arrival related information. In another example, the user interface 20 may automatically display the critical data for the RTA constraint 21 based on a flight condition of the aircraft 12 and/or based on information entered by a user.

Figure 2:
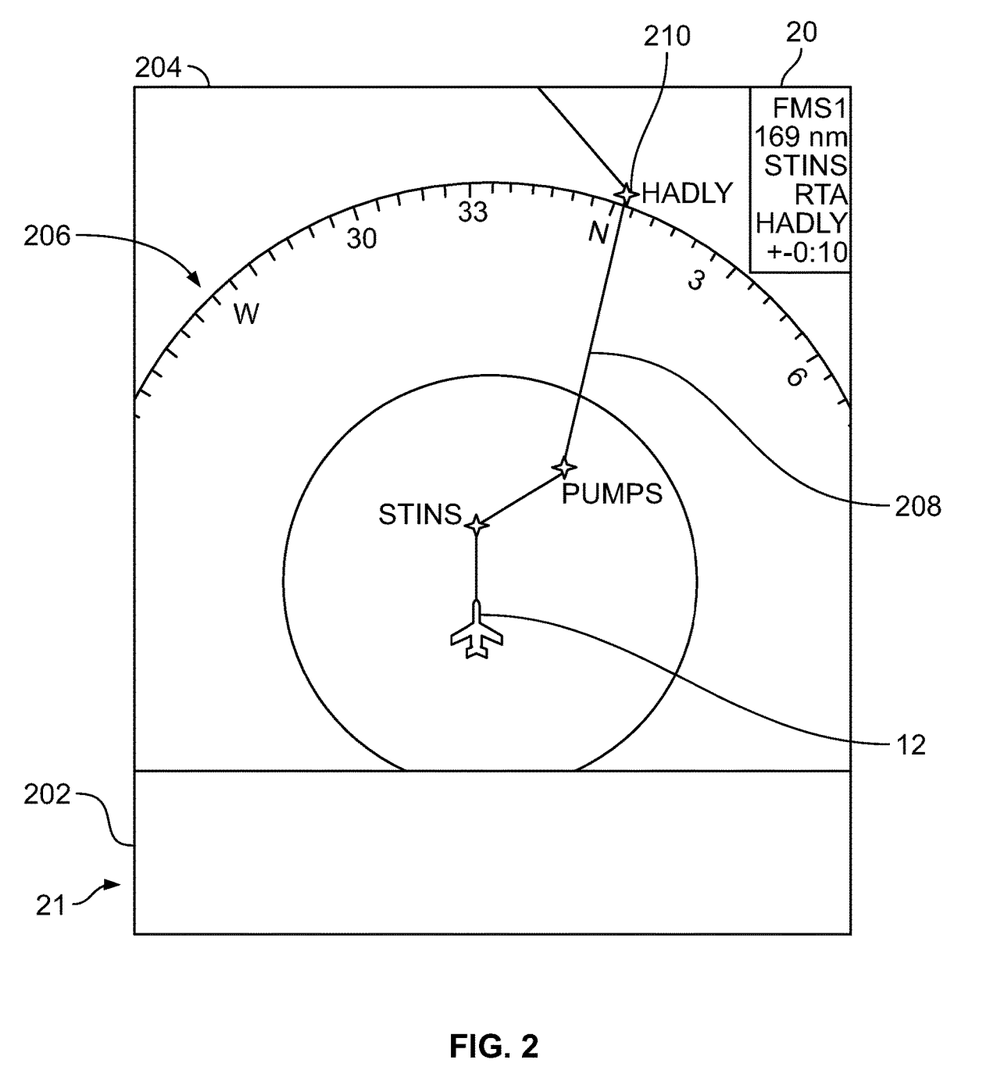
FIG. 2 illustrates an arrangement of a cockpit display with a dialog box of the user interface that may be generated by an RTA constraint controller, in accordance with exemplary embodiments.

In various embodiments, as shown in FIG. 2, the lateral display 206 of a cockpit display generally includes a display box 204 with a lateral display 206 that displays the trajectory of the aircraft 12 along a flight path 208 (e.g., displayed in two or three dimensions), and one or more waypoints. With respect to a waypoint 210 of the RTA constraint operation, the system 10 presents various graphical representations of the critical RTA constraint data 21 in a dialogue box 202 alongside the display box 204, the specific presentation of the RTA constraint data 21, as illustrated in FIGS. 3-9, is in accordance with rules and algorithms of the graphical user interface 20.

Figure 3:
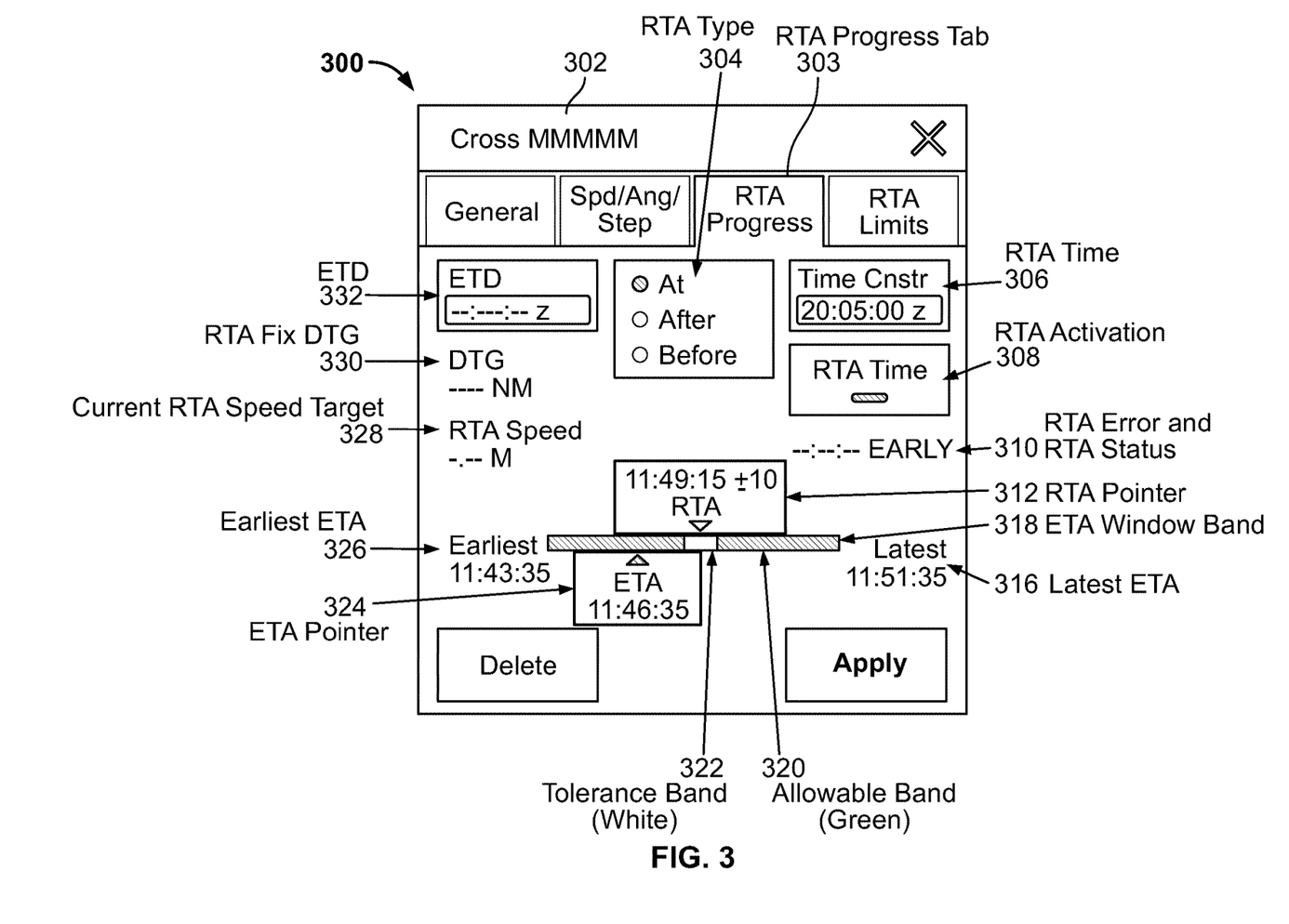
FIGS. 3-9 illustrate various graphical representations of critical data for an RTA constraint on the dialogue box of the graphical user interface generated by the RTA constraint controller, in accordance with exemplary embodiments

Turning now to FIG. 3, and with continued reference to FIGS. 1-2, the dialogue box 300 displays the waypoint 302 of the RTA constraint operation and the calculated critical data for the RTA constraint 21 to the pilot such that it can be used in the required time of arrival negotiation process between the Air Traffic Controller (ATC) and the pilot. By means of the user interface 20 and the display methods discussed herein, the pilot can assess different solutions along any point of an already negotiated two or three-dimensional trajectory as requested by the ATC.

Dialogue box 300 displays the waypoint 302 name and an RTA progress tab 303 displays the calculated critical data for the RTA constraint 21. The calculated critical data for the RTA constraint 21 displayed by the user interface 20 may include, but is not limited to, an RTA type 304, an RTA time 306, an indication of whether the RTA is active (RTA activation 308), an area to indicate any RTA error and RTA status 310, an RTA pointer 312, a latest ETA 316, an ETA window band 318, an allowable band 320 (may be depicted in a first color, such as green), a tolerance band 322 (may be depicted in a second color, such as white), an ETA pointer 324, an earliest ETA 326, a current RTA speed target 328, an indicator for RTA Fix DTG 330, and an indicator for ETD 332. Each of these items of data will be described in more detail below.

Figure 4:
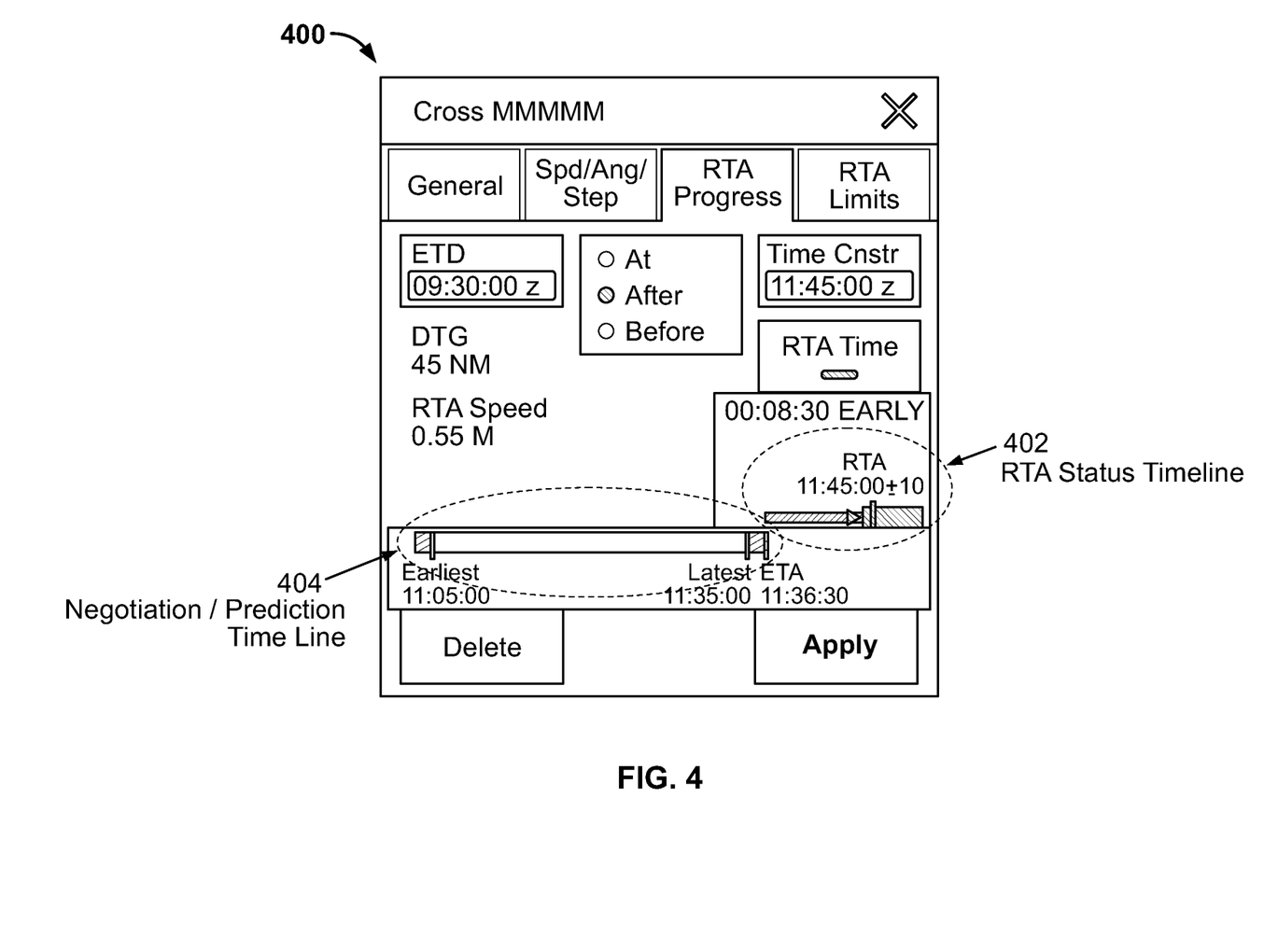

With reference to FIG. 4, dialog box 400 shows two additional graphical display features generated by the RTA constraint controller 16 to improve the human-machine interface presentation of critical data for the RTA constraint 21. An RTA status timeline 402 is added in an area below the RTA activation 308 object; and a Negotiation/Prediction timeline 404 is added to provide detail to the demarcation line connecting the Earliest ETA 326 and Latest ETA 316.

Figure 5:
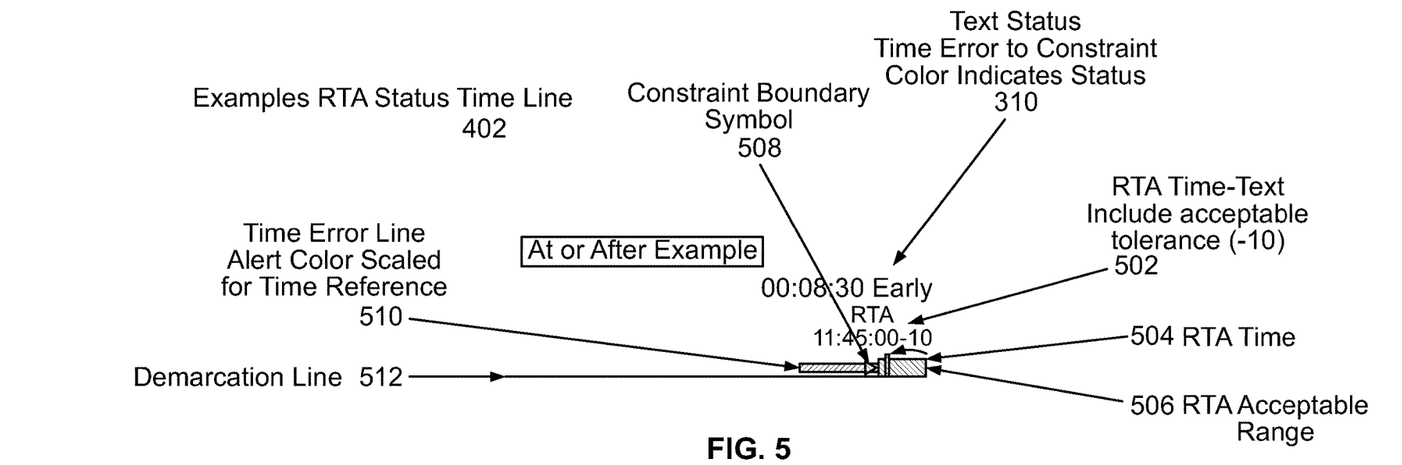
Figure 6:
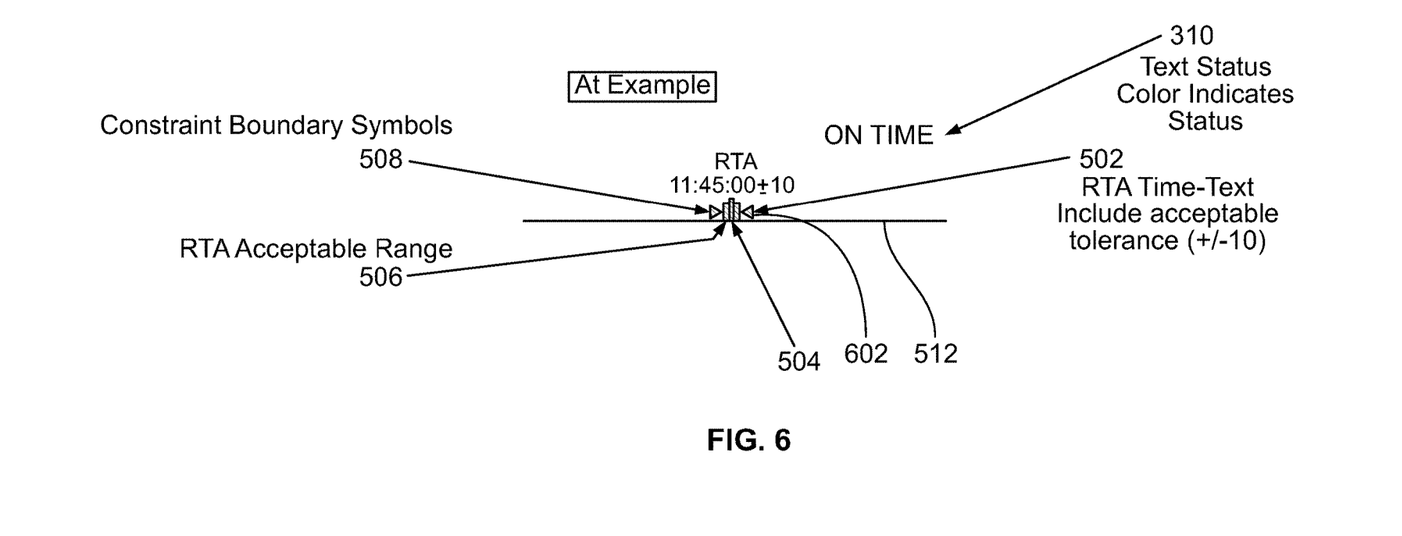

FIGS. 5-6 illustrate examples of the RTA status timeline 402 feature. In FIG. 5, the RTA type 304 is "at or after," and the text for the RTA status 310 indicates "00:08:30 Early." RTA time text 502 is displayed as 11:45:00+/−10 and an indicator 506 (shown as a first color block) indicates the RTA acceptable range 506 around the RTA time 504. With respect to the RTA acceptable range 506, it is bounded by an RTA maximum and an RTA minimum, and based on the current limitations (aircraft performance, environmental, etc), a speed to achieve the RTA maximum and RTA minimum is dynamically calculated. Where either the RTA maximum or RTA minimum are constrained, a constraint boundary symbol is used. IN FIG. 5, a constraint boundary symbol 508 is depicted at the left of the indicator 506; in this example, the constraint boundary symbol 508 is a triangle oriented to point to the indicator 506. There is no constraint boundary symbol on the right, at the maximum RTA, in FIG. 5. An indicator for time error line 510 is to the left of the constraint boundary symbol 508, and this may be scaled to show a time reference and may be rendered in a second color. The time error represents a difference between a pilot input constraint (RTA goal at the waypoint) and the estimated time of arrival at the waypoint. A demarcation line 512 may be placed horizontally below the indicators and symbols 504-510.

In FIG. 6, the RTA type 304 is "at," and the text for RTA status 310 indicates "On time." RTA time text 502 is 11:45:00+/−10 and an indicator 506 (shown as a first color block) indicates the RTA acceptable range 506 around the RTA time 504. Constraint boundary symbol 508 is depicted at the left of the indicator 506; in this example, the constraint boundary symbol 508 is a triangle oriented to point to the indicator 506. Constraint boundary symbol 602 is depicted at the right of the indicator 506; in this example, the constraint boundary symbol 508 is a triangle oriented to point to the indicator 506.

Figure 7:
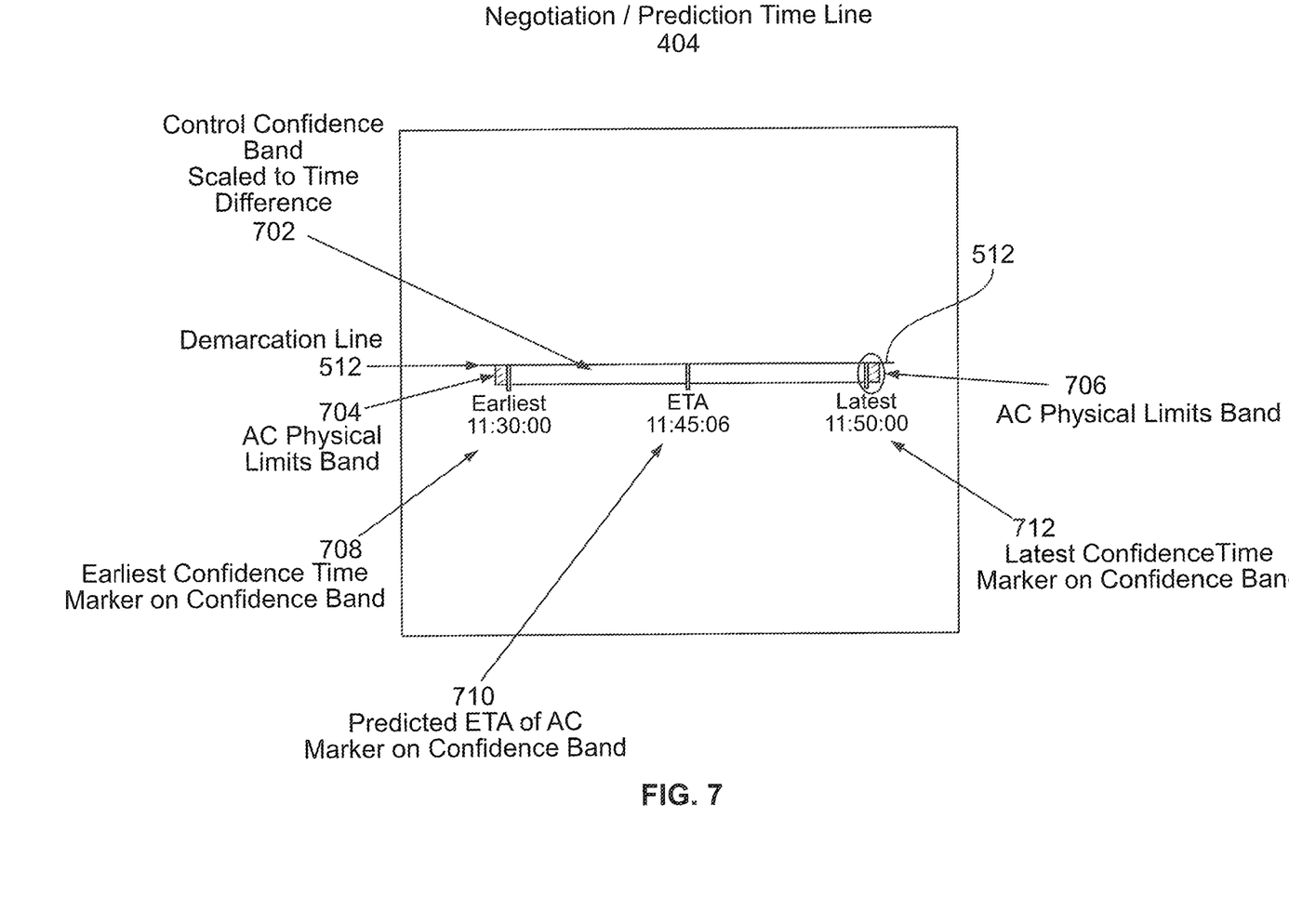

FIG. 7 provides detail for graphical information displayed below the demarcation line 512, on the Negotiation/Prediction timeline 404. A Control Confidence Band 702 is scaled to a time difference and rendered underneath the demarcation line 512, bisected by the predicted ETA of the aircraft 710. An indicator for aircraft physical limits 704 is shown as a hatched area that extends the control confidence band 702 to the left. An indicator for aircraft physical limits 706 is shown as a hatched area that extends the control confidence band 702 to the right. The Earliest confidence time 708 and the Latest confidence time 712 are is indicated with markers on the control confidence band 702.

Figure 8:
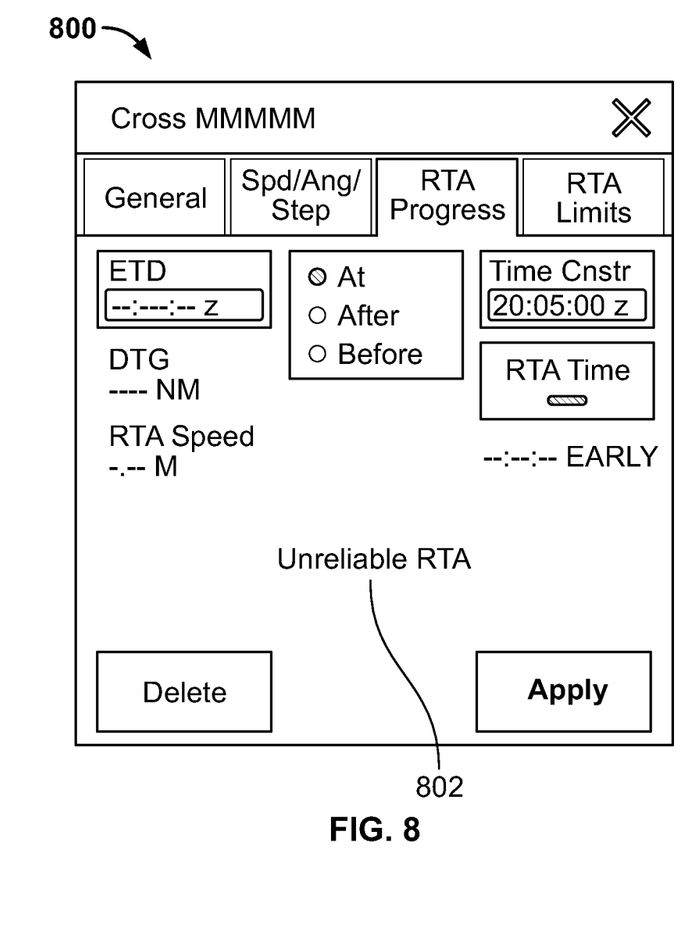
Figure 9:
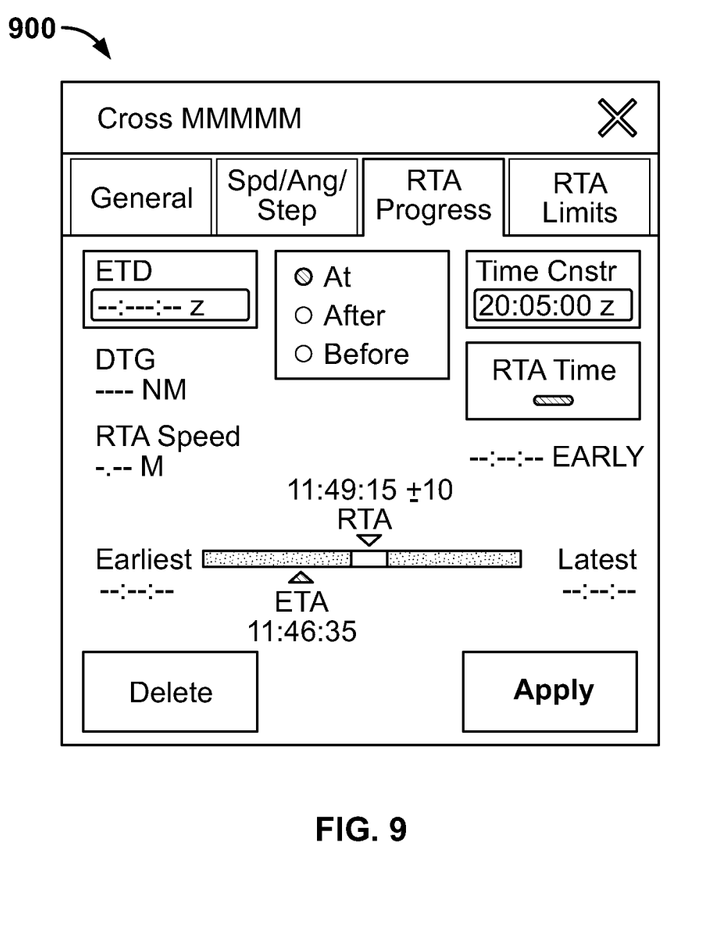

FIGS. 8-9 depict various ways in which the system 10 may use the graphical display to indicate to the pilot that the 95% reliable condition cannot be met for the waypoint. In FIG. 8, dialog box 800 displays "Unreliable RTA" 802 in the area that previously displayed the Negotiation/Prediction Timeline 404. In FIG. 9, dialog box 900 omits much of the previously described calculated critical data for the RTA constraint 21.

Figure 10:
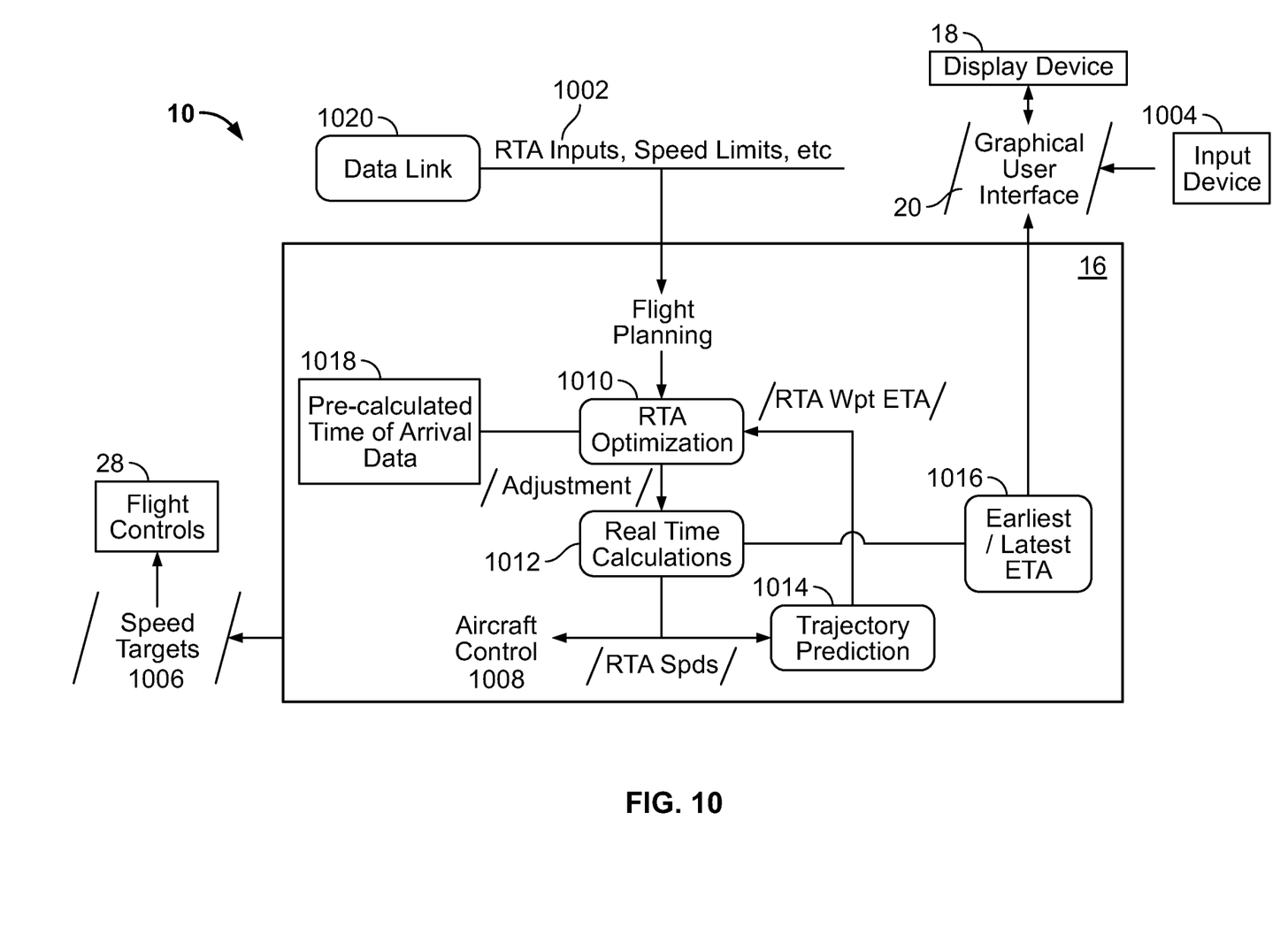
FIG. 10 is a process diagram for a system for graphical representation of required time of arrival (RTA) constraint information for an aircraft, in accordance with exemplary embodiments.
Figure 11:
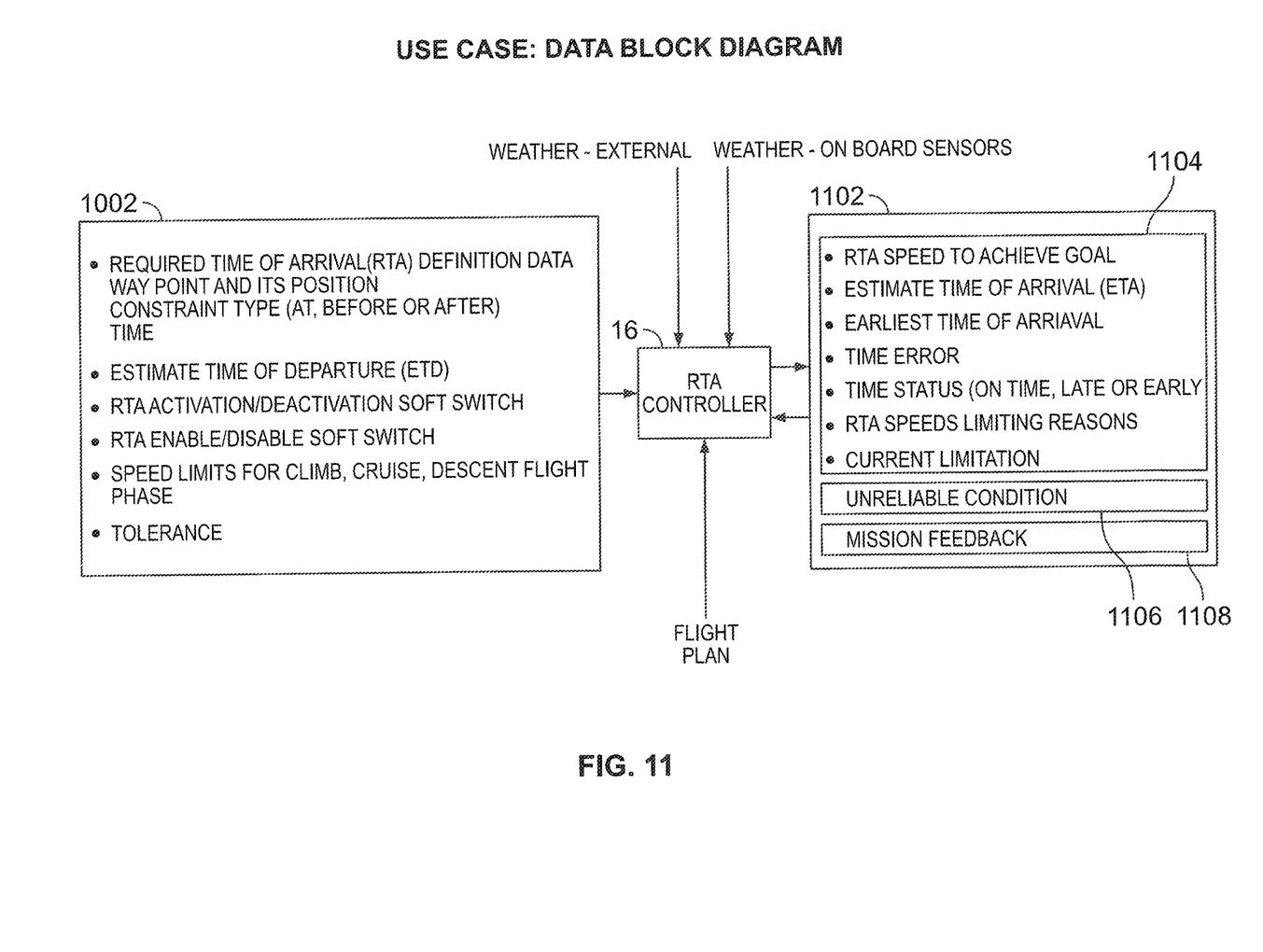
FIG. 11 provides a use case for a system for graphical representation of required time of arrival (RTA) constraint information for an aircraft, in accordance with exemplary embodiments.

Having described the graphical presentation of the critical data for the RTA constraint 21, via the user interface 20, we now discuss functionality of the system 10 and the RTA constraint controller 16. Turning now to FIGS. 10-11, in various embodiments of the system 10, rules embodied in an algorithm of the RTA constraint controller 16 may direct the receipt of inputs 1002, such as flight plan data, RTA inputs, and user input, and generation of output commands, data, and controls, such as aircraft control 1008 and speed targets 1006. The rules embodied in the algorithm of the RTA constraint controller 16 may direct the graphical user interface 20 and presentation of critical RTA constraint data 21 on the display 18. In various embodiments, the RTA constraint controller 16 may also manage the presentation of the lateral display (FIG. 2, 206) and a vertical situation display.

With regard to the inputs 1002, the user input may be received based on a user interacting with the user interface 20. The user input may include activating/deactivating the RTA constraint controller 16 functionality, enabling/disabling the RTA, speed limits for a climb, a cruise, and a descent flight phase, the specific waypoint 210, a target RTA time, and a waypoint distance offset. Other inputs 1002 shown in FIG. 11 may be provided by a Datalink 1020 (see FIG. 10), via ATC transcription, or via a connected technology, these other inputs include a required time of arrival (RTA) definition data waypoint and its position constraint type (at, before, or after) time, an estimated time of departure (ETD), and an RTA tolerance value.

As mentioned, the RTA constraint controller 16 may receive forecasted external weather reports, and current weather data from onboard sensors 32. The flight plan (FP) data may be received from a flight plan database or other on-board system or module in control of the flight plan, including the FMS 30. In various embodiments of the system 10, the RTA constraint controller 16 may be partitioned into any number of sub-modules, each directed to performing a different process of system 10. Accordingly, in various embodiments, the RTA constraint controller 16 includes an RTA optimization module 1010, a real time calculations module 1012, a trajectory prediction module 1014, and an earliest/latest ETA module 1016.

The RTA optimization module 1010 receives pre-calculated time of arrival data 1018 and the input flight planning data 1002, as well as estimated RTA waypoint data output from the trajectory prediction module 1014, and calculates adjustments for flight controls, the adjustments are received by the real time calculations module 1012, which drives the recommended speed for achieving a target RTA; the output from the real time calculations module 1012 feeds the trajectory prediction module 1014, the aircraft control 1008, the speed targets 1006, and ultimately the flight controls 28.

The user interface 20 presents the output 1102 data as described and shown in FIGS. 3-9. For example, the displayed RTA constraint data 1104 may include the current RTA speed 328 to achieve the goal waypoint, the ETA (graphically, an ETA pointer 324, and an ETA band—the negotiation/prediction timeline 404—extending from an ETA earliest 326, and ETA latest 316). The time error is also included with the RTA status 310 (the time error being a difference between the input RTA provided by the pilot and the ETA that has been calculated by the system 10), a RTA status timeline 402 (as described in connection with FIGS. 5-6) and alphanumeric RTA status 310, display of RTA speed limiting reasons, such as thrust or operating performance reasons, and the display of any current limitations, for example, as shown with the AC physical limits bands 704 and 706 on the control confidence band 702. Unreliable condition 1106 feedback may be presented on the user interface 20 as shown in FIG. 8, 802, as an alphanumeric message with other viewing areas zeroed out. The system 10 determines that an unreliable condition has occurred when it determines that the aircraft cannot meet, based on aircraft performance data or environmental (weather) data, the 95% confidence interval to meet the RTA. Additional mission feedback 1108 may be presented.

In various embodiments, the RTA constraint controller 16 retrieves from the information datastore 14 precalculated data, such as a precalculated ETA minimum data, precalculated ETA maximum data, and a precalculated optimal RTA value for a given point on the flight path that is near or associated with the waypoint 210. The RTA constraint controller 16 data may then interpolate the precalculated data based on the RTA tolerance 1020 and a waypoint distance offset. In some embodiments, the RTA tolerance may be plus or minus ten seconds.

In various embodiments, simple linear interpolation or any other suitable interpolation procedure may be performed on the precalculated data considering internal segmentation of the flight plan related data in the information datastore 14. The RTA constraint controller 16 data manager module may therefrom generate the critical data for the RTA constraint based on the results of the interpolation. As can be appreciated, the RTA constraint controller 16 data manager module may similarly access the information datastore 14 for the fuel impact, the ETE values, the flown distance impact, and the other values as described above.

Figure 12:
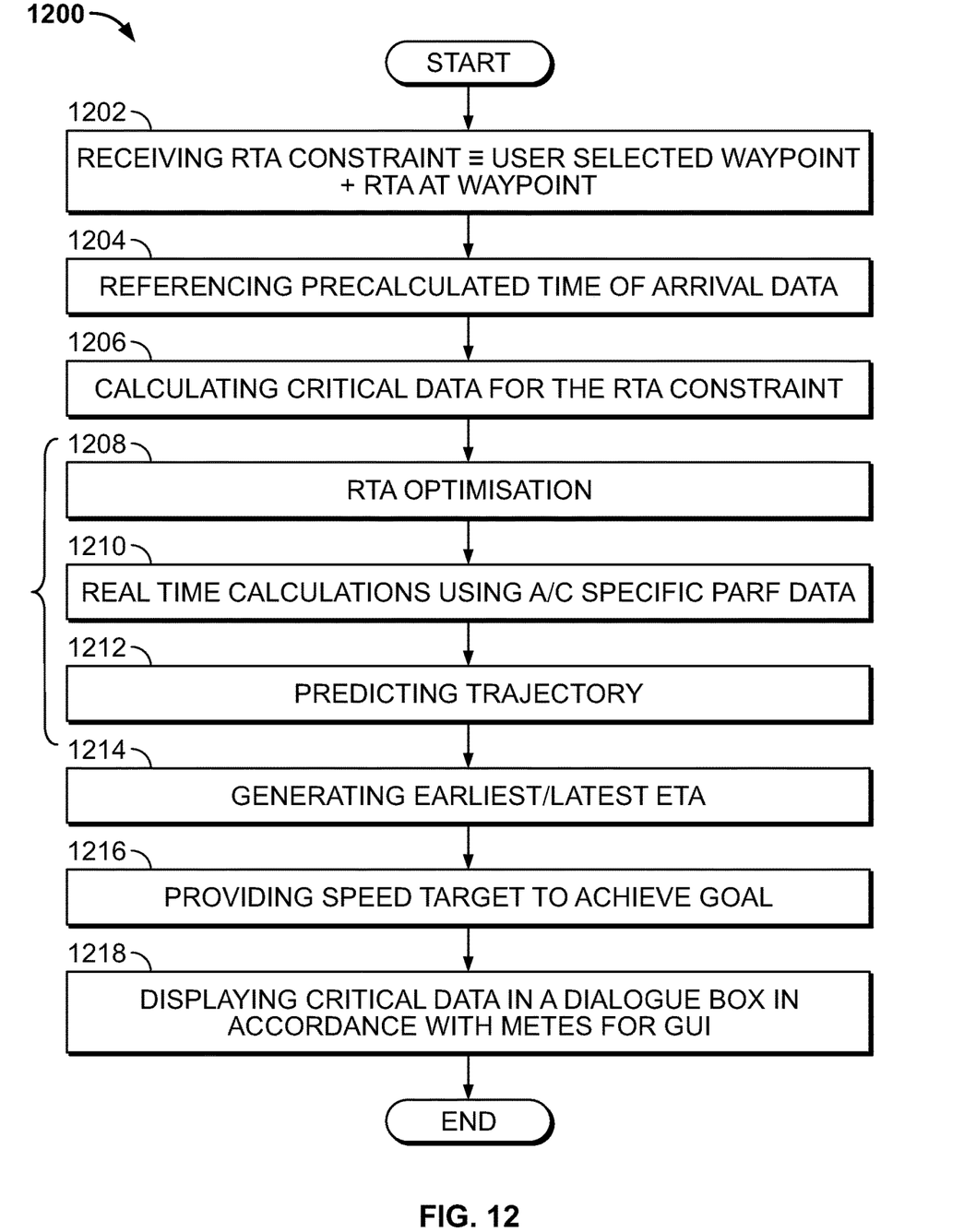
FIG. 12 is a method for graphical representation of required time of arrival (RTA) constraint information for an aircraft, in accordance with exemplary embodiments.

Turning now to FIG. 12, the system 10 described above may be implemented by a processor-executable method 1200. For illustrative purposes, the following description of method 1200 may refer to elements mentioned above in connection with FIGS. 1-11. In practice, portions of method 1200 may be performed by different components of the described system. It should be appreciated that method 1200 may include any number of additional or alternative tasks, the tasks shown in FIG. 12 need not be performed in the illustrated order, and method 1200 may be incorporated into a more comprehensive procedure or method having additional functionality not described in detail herein. Moreover, one or more of the tasks shown in FIG. 6 could be omitted from an embodiment of the method 1200 as long as the intended overall functionality remains intact.

Prior to starting method 1200, an initialization may be performed, the initialization may include loading instructions and the software program into a processor within the RTA controller 16, as well as loading predefined values into one or more datastore(s) 14.

At 1202, an RTA constraint is received, it comprises a user selected waypoint (WPT) and a required time of arrival (RTA) at the WPT. At 1204 precalculated times of arrival data are referenced for the WPT. At 1206, critical data for the RTA constraint is calculated. The critical data calculation step 1206 include steps 1208-1212, described in connection with respective modules in FIG. 10. At 1208, the RTA optimization is performed, at 1210 the real time calculations using aircraft specific performance data, environmental data, and the like, are performed. At 1212 the current trajectory is predicted for the aircraft. At 1214 the earliest and latest ETA are generated for the negotiation/prediction timeline 402, and at 1216, the speed targets to achieve the goal of the RTA are generated. At 1218, the suite of RTA constraint data 21 is displayed on the dialogue box 202.

Thus, an objectively improved human-machine interface is provided for RTA constraint negotiation. Embodiments present information and results of the data calculations back to the pilot in a concise and informative manner to ease the workload of the crew in negotiating this critical constraint with ATC, accepting the clearance and having confidence in the system that it will achieve the defined RTA constraint.

Those of skill in the art will appreciate that the various illustrative logical blocks, modules, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for managing information associated with a required time of arrival (RTA) for an aircraft and displaying it on a display device configured to generate a display including a trajectory of the aircraft on a flight plan (FP), comprising:

at a processor, receiving aircraft status data for the aircraft;

receiving aircraft performance data from onboard sensors;

determining a plurality of phases of flight for the FP;

receiving user RTA clearance input including an RTA waypoint on the FP, an associated RTA, and a time tolerance at the RTA;

receiving a user input RTA limit speed;

computing RTA limits based on the RTA and the time tolerance at the RTA;

referencing environmental data;

constructing a plan comprising, for each phase of flight of the plurality of phases of flight for the flight plan, a respective speed target, for the aircraft to arrive at the RTA within the time tolerance and as a function of the environmental data and the RTA limit speed;

computing an estimated time of arrival (ETA) based on a summation of each respective speed target and the aircraft performance data;

computing an ETA window based on the RTA limits and the aircraft performance data;

adjusting a phase of flight speed to meet the respective speed target for at least one of the plurality of phases of flight, responsive to the ETA;

generating a dialogue box in a dedicated area on the display; and presenting, using graphical display techniques, critical data including the RTA, RTA limits, the ETA, and the ETA Window, wherein the presenting includes utilizing a visualization technique to depict a performance tolerance on one or more of the critical data, the performance tolerance being a function of the aircraft performance data.

2. The method of claim 1, further comprising:
computing a time error, defined as a difference between the RTA and the ETA; and
wherein the critical data further includes the time error, displaying the time error in the dialogue box.

3. The method of claim 2, further comprising:
determining a time status based on the time error, the time status being one of early, on time, and late; and
wherein the critical data further includes the time status, displaying the time status in the dialogue box.

4. The method of claim 2, further comprising depicting the time error in the dialogue box as a visually distinguishable band.

5. The method of claim 2, further comprising:
transmitting, via a communications circuit onboard the aircraft, the time error and aircraft status data to a neighbor aircraft or air traffic control (ATC).

6. The method of claim 1, wherein the user RTA clearance input further includes an RTA type from among: At the RTA, At or before the RTA, and At or After the RTA.

7. The method of claim 1, further comprising:
receiving a user input modification of at least one of the user RTA clearance input and the time tolerance at the RTA; and
repeating, based on the modification, the steps of:
computing the RTA limits based on the RTA and the time tolerance at the RTA;
referencing the environmental data;
constructing the plan comprising, for each phase of flight of the plurality of phases of flight for the flight plan, the respective speed target, for the aircraft to arrive at the RTA within the time tolerance and as the function of the environmental data and the RTA limit speed;

computing the estimated time of arrival (ETA) based on the summation of the phase of flight speed targets and the aircraft performance data;
computing the ETA window based on the RTA limits and the aircraft performance data; and
adjusting the phase of flight speed to meet the respective speed target for at least one of the plurality of phases of flight, responsive to the ETA.

8. The method of claim 1, wherein the environmental data includes weather data from a weather data source, and further comprising:
determining that if the aircraft cannot achieve the RTA; and
presenting, in the dialogue box, an unreliable condition message when the aircraft cannot achieve the RTA.

9. The method of claim 1, further comprising:
identifying an RTA speed limiting reason, responsive to determining that the aircraft cannot achieve the RTA.

10. A system for managing information associated with a required time of arrival (RTA) information for an aircraft and displaying it on a display device configured to generate a display including a trajectory of the aircraft on a flight plan (FP), comprising:
a memory comprising an RTA constraint controller program; and
a processor coupled to the memory and configured to:
receive aircraft status data for the aircraft;
receive aircraft performance data from onboard sensors;
determine a plurality of phases of flight for the FP;
receive user RTA clearance input including an RTA waypoint on the FP, an associated RTA, and a time tolerance at the RTA;
receive a user input RTA limit speed;
compute RTA limits based on the RTA and the time tolerance at the RTA;
receive environmental data;
construct a plan comprising, for each phase of flight of the plurality of phases of flight for the flight plan, a respective speed target, for the aircraft to arrive at the RTA within the time tolerance and as a function of the environmental data and the RTA limit speed;
compute an estimated time of arrival (ETA) based on a summation of each respective speed target and the aircraft performance data;
compute an ETA window based on the RTA limits and the aircraft performance data;
adjust a phase of flight speed to meet the respective speed target for at least one of the plurality of phases of flight, responsive to the ETA;
generate a dialogue box in a dedicated area on the display; and
present, using graphical display techniques, critical data including the RTA, RTA limits, the ETA, and the ETA Window, wherein the presenting includes utilizing a visualization technique to depict a performance tolerance on one or more of the critical data, the performance tolerance being a function of the aircraft performance data.

11. The system of claim 10, wherein the processor is further configured to:
compute a time error, defined as a difference between the RTA and the ETA; and
wherein the critical data further includes the time error, displaying the time error in the dialogue box.

12. The system of claim 11, wherein the processor is further configured to:

determine a time status based on the time error, the time status being one of early, on time, and late; and wherein the critical data further includes the time status, displaying the time status in the dialogue box.

13. The system of claim 11, wherein the processor is further configured to:

receive a user input modification of at least one of the user RTA clearance input and the time tolerance at the RTA; and repeat, based on the modification, the steps of:

computing the RTA limits based on the RTA and the time tolerance at the RTA;

referencing the environmental data;

constructing the plan comprising, for each phase of flight of the plurality of phases of flight for the flight plan, the respective speed target, for the aircraft to arrive at the RTA within the time tolerance and as the function of the environmental data and the RTA limit speed;

computing the estimated time of arrival (ETA) based on the summation of the phase of flight speed targets and the aircraft performance data;

computing the ETA window based on the RTA limits and the aircraft performance data; and adjusting the phase of flight speed to meet the respective speed target for at least one of the plurality of phases of flight, responsive to the ETA.

14. The system of claim 11, wherein the processor is further configured to depict the time error in the dialogue box as a visually distinguishable band.

15. The system of claim 11, wherein the processor is further configured to:

transmit, via a communications circuit onboard the aircraft, the time error and aircraft status data to a neighbor aircraft or air traffic control (ATC).

16. The system of claim 10, wherein the user RTA clearance input further includes an RTA type from among: At the RTA, At or before the RTA, and At or After the RTA.

17. The system of claim 10, wherein the environmental data includes weather data from a weather data source, and wherein the processor is further configured to:

determine if the aircraft cannot achieve the RTA; and present, in the dialogue box, an unreliable condition message when the aircraft cannot achieve the RTA.

18. The system of claim 10, wherein the processor is further configured to identify an RTA speed limiting reason, responsive to determining that the aircraft cannot achieve the RTA.

19. An aircraft, comprising:

a display device configured to generate a display including a trajectory of the aircraft on a flight plan (FP); and a system for managing information associated with a required time of arrival (RTA) for the aircraft and displaying it on the display device, comprising:

a memory comprising an RTA constraint controller program; and a processor coupled to the memory and configured to:

receive aircraft status data for the aircraft;

receive aircraft performance data from onboard sensors;

determine a plurality of phases of flight for the FP;

receive user RTA clearance input including an RTA waypoint on the FP, an associated RTA, and a time tolerance at the RTA;

receive a user input RTA limit speed;

compute RTA limits based on the RTA and the time tolerance at the RTA;

receive environmental data;

construct a plan comprising, for each phase of flight of the plurality of phases of flight for the flight plan, a respective speed target, for the aircraft to arrive at the RTA within the time tolerance and as a function of the environmental data and the RTA limit speed;

compute an estimated time of arrival (ETA) based on a summation of each respective speed target and the aircraft performance data;

compute an ETA window based on the RTA limits and the aircraft performance data;

adjust a phase of flight speed to meet the respective speed target for at least one of the plurality of phases of flight, responsive to the ETA;

compute a time error, defined as a difference between the RTA and the ETA;

generate a dialogue box in a dedicated area on the display; and present, using graphical display techniques, critical data including the RTA, RTA limits, the ETA, and the ETA Window, wherein the presenting includes utilizing a visualization technique to depict a performance tolerance on one or more of the critical data, the performance tolerance being a function of the aircraft performance data.

20. The system of claim 19, wherein the processor is further configured to:

determine a time status based on the time error, the time status being one of early, on time, and late; and wherein the critical data further includes the time status, displaying the time status in the dialogue box.

* * * * *